United States Patent Office 3,356,486
Patented Dec. 5, 1967

3,356,486
BENZENE HEXACHLORIDE AS A PREEMERGENCE HERBICIDE
Bryant Leonidas Walworth, Pennington, N.J., assignor to American Cyanamid Company, Stamford, Conn., a corporation of Maine
No Drawing. Filed Mar. 16, 1964, Ser. No. 352,296
5 Claims. (Cl. 71—126)

ABSTRACT OF THE DISCLOSURE

The present invention relates to a method for a preemergence control of undesirable grasses by applying to soil containing seeds of said grasses the gamma and/or delta isomers of benzene hexachloride.

---

This invention relates to preemergence herbicidal compositions and to methods for the preemergence control of undesirable grasses employing said compositions.

More particularly, this invention relates to compositions and methods employing the same of selectively inhibiting the germination of seeds of crabgrass, barnyard grass, foxtail and the like.

While there are many known herbicides, including both preemergence and foliar, they are not selective and hence, when applied to control the growth of undesirable plant life, also destroy economically or esthetically important growth.

In addition, many of the known herbicidal materials are relatively expensive to manufacture and thus relatively expensive to employ where large acreage may be involved, and the rate of application to achieve effective result is substantial.

Accordingly, it is an object of the present invention to provide a method for the selective preemergence control of undesirable grasses, which control does not result in the substantial stoppage of growth or destruction of economically important or esthetically desirable grasses.

It is a further object of the present invention to provide such a selective preemergence herbicide which is relatively inexpensive and may thus be employed in substantial dosage over large acreage at relatively reasonable costs.

These and other objects and advantages of the present invention will become more apparent from the detailed description thereof set forth hereinbelow.

In accordance with the present invention, a method for the preemergence control of undesirable grasses is provided which comprises applying to soil containing seeds of said grasses a composition comprising benzene hexachloride as a preemergence herbicide, said benzene hexachloride composition containing as the principal active herbicidal ingredient an isomer selected from the group consisting of the gamma isomer, the delta isomer and mixtures thereof. The benzene hexachloride composition is employed in an amount sufficient to effect the preemergence herbicidal control of said undesirable grasses.

While benzene hexachloride, frequently called hexachlorocyclohexane, is known to be an insecticide, and further its delta isomer is known to kill aquatic plants at a given concentration in parts per million, the discovery that benzene hexachloride compositions containing the minimum concentration of gamma and/or delta isomer are effective as a preemergence herbicide and especially as a selective preemergence herbicide, i.e., one that does not control or destroy all seed life or growth, is indeed surprising and unobvious. Thus, I have discovered that the gamma and/or delta isomer, when applied at the rate of at least about 5 pounds and preferably from about 8 to 10 pounds per acre, is highly effective as a preemergence herbicide. Since benzene hexachloride is normally and less expensively obtained as isomeric mixtures containing alpha, beta, delta, gamma and other isomers, I have determined that isomeric compositions containing about 20% or more by weight of the gamma and/or delta isomers, when applied at a rate of about 25 or more pounds per acre, are also highly effective as preemergence herbicides.

A particularly important end use in accordance with this invention is the preemergence control of various grasses such as crabgrass, barnyard grass, foxtail and other undesirable grasses which frequently infest lawns. It has also been determined that when the benzene hexachloride compositions of this invention are applied, even at excessive rates approaching 80 pounds per acre, they do not adversely affect the desirable grasses in established lawns, but will prevent the establishment of undesirable weeds and grasses if the applications are made prior to seed germination. It might be noted that the use of benzene hexachloride compositions of this invention have the added advantage that they can prevent damage to established lawn areas by controlling, at least to some extent, insect populations which normally infest such areas.

The benzene hexachloride compositions of this invention may be employed as liquid concentrates or as emulsions or dispersions, in solvent containing solutions or as wettable powders, in which composition they constitute from about 5 to about 95% by weight of the total composition.

If aqueous dispersions or emulsions are to be prepared or employed, those surfactants normally employed for such purposes may be utilized with the benzene hexachloride compositions of this invention. Thus, the sodium alkyl aryl sulfonates, sorbitol long chain fatty acid esters, the alkyl aryl sulfonic acids and the like may be employed normally in amounts of from between about 2 and 30% of the composition.

As solvents, cyclohexanone, benzene, xylene, toluene and various other hydrocarbon petroleum distillates may be employed. The proportion of the benzene hexachloride composition employed in a suitable solvent may vary from about 2 to about 50% or higher and is determined largely by the benzene hexachloride composition and the solubilities of the various constituents employed therein.

As a dry powder, dispersions or solutions of the benzene hexachloride compositions may be applied to finely divided carriers such as diatomaceous earth, fuller's earth, attaclay, charcoal and other known carriers, where they may constitute from between about 5 and 95% by weight of the total composition.

In application to the area to be treated, the benzene hexachloride composition may be applied by spraying or the use of mechanical spreaders in accordance with conventional practice.

In order that the present invention will be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples and tables, reference will be made to the Herbicidal Activity Index. This index is a relative evaluation based upon a visual examination of the treated plants and the values reported therein are in accordance with the following Herbicidal Activity Index.

*Herbicidal Activity Index*

0=No apparent effect
1=Slight injury
2=Moderate injury
3=Severe injury, no plants killed
3+=Severe injury, up to 50% plants killed

*Herbicidal Activity Index*—Continued

4=Severe injury, 50 to 75% plants killed
4+=Severe injury, 75 to 95% plants killed
5−=Severe injury, 95 to 100% plants killed
5=All plants killed.

*Example 1—Preemergence herbicidal activity*

Approximately 1 inch of each of the seed-soil mixtures are placed on top of approximately 1½ inches of potting soil in individual one-pint cups. Each cup is sprayed with a solution or fine suspension containing a sufficient quantity of the test material (i.e. benzene hexachloride or the gamma or delta isomers of BHC) to provide a concentration of active material in each cup equivalent to approximately 5, 10, 15, 20, 25, 40 or 80 pounds per acre. The cups are then placed on greenhouse benches and attended to in the routine manner for 2 weeks. Upon termination of the two-week test period, the cups are visually examined and each rated according to the Herbicidal Activity Index set forth above.

The results are recorded in Table I below.

to approximately 4.45, 8.9, 16.9, 17.7, 33.8, 50.6 and 76 pounds per acre when applied in 25 ml. of solution to seeded one-pint cups. Seeds of crabgrass and millet were thoroughly mixed with potting soil, placed in pint cups on top of approximately 1 inch of potting soil, tamped lightly and watered with 25 ml. of tap water. Individual seeded cups were then treated with 25 ml. of test solution containing the amount of active material required to produce the desired concentration. After watering, the cups were placed on greenhouse benches, attended to in the usual manner for 2 weeks and then examined. Each cup was rated according to the Herbicidal Activity Index given above and the results obtained are recorded in Table II below.

From these results it is readily seen that both the alpha and beta isomers of benzene hexachloride are ineffectual as preemergence herbicides since no control is obtained. It can also be seen that both the gamma and the delta isomers are effective preemergence herbicides when applied at the rate of about 8 or more pounds per acre.

TABLE I

| | Number lbs. per acre | Millet | Ryegrass | Barnyard grass | Crabgrass | Fescue | Bentgrass | Kentucky Bluegrass | Pigweed | Giant Foxtail |
|---|---|---|---|---|---|---|---|---|---|---|
| Benzene hexachloride wettable powder containing a minimum of 12% gamma isomer, 60% other isomers, a minimum of 7% delta isomer. | 25 | 5− | 0 | 4 | 5− | 3+ | 0 | 0 | − | − |
| | 15 | 4+ | 0 | 3+ | 5− | 0 | 0 | 0 | − | − |
| | 10 | 4 | 0 | 0 | 3+ | 0 | 0 | 0 | − | − |
| Benzene hexachloride containing 16.9% gamma isomer, 73% other isomers, a minimum of 9.9% delta isomer. | 80 | 5 | − | − | 5− | 4+ | 5 | 4+ | 5 | 5 |
| | 40 | 5 | − | − | 5− | 4 | 5 | 3+ | 5 | 5 |
| | 20 | 5− | − | − | 5− | 0 | 4 | 0 | 5− | 5 |
| | 10 | 5− | − | − | 3+ | 0 | 0 | 0 | 0 | 5− |
| | 5 | 0 | − | − | 0 | 0 | 0 | 0 | 0 | 0 |
| Gamma isomer of benzene hexachloride | 80 | 5 | − | − | 5 | 5 | 5 | 5 | 5 | 5 |
| | 40 | 5 | − | − | 5 | 4+ | 5 | 5− | 5 | 5 |
| | 25 | 5 | 0 | 4+ | 5 | 5− | 5− | 3+ | − | − |
| | 20 | 5 | − | − | 5 | 4 | 5− | 3+ | 5 | 5 |
| | 15 | 5 | 0 | 4 | 5 | 3+ | 3+ | 0 | − | − |
| | 10 | 5 | 0 | 3+ | 5 | 2 | 2 | 2 | 5 | 5 |
| | 5 | 5 | − | − | 3+ | 0 | 3+ | 0 | 2 | 5− |

It will be seen from Table I above that the gamma isomer effectively controls millet, barnyard grass and crabgrass at the rate of 10 pounds per ace, without significantly affecting the growth of seeded fescue and Kentucky bluegrass. It will also be seen that benzene hexachloride wettable powder containing a minimum of 12% gamma isomer and 60% of mixed alpha, beta, delta and epsilon isomers with a minimum of 7% delta isomer will effectively control millet, crabgrass and barnyard grass when applied at a rate of 25 pounds per acre. Further, Table I establishes that benzene hexachloride containing a minimum of 16.9% gamma isomer and 83% of mixed alpha, beta, delta and epsilon isomers with a minimum of 9.9% delta will effectively control millet, crabgrass, bentgrass pigweed and giant foxtail when applied at the rate of 20 or more pounds per acre.

*Example 2—Preemergence herbicidal activity of the alpha, beta, delta and gamma isomers of benzene hexachloride*

To determine the activity of the various isomers of benzene hexachloride, solutions of each of the isomers were prepared in 35/65% acetone-water mixtures with a sufficient quantity of each isomer dissolved or dispersed in 25 ml. of solution to produce concentrations equivalent

TABLE II

| | Number lbs. per acre | Crabgrass | Millet |
|---|---|---|---|
| Gamma isomer | 76 | 5 | 5 |
| | 50.6 | 5 | 5 |
| | 33.8 | 5 | 5 |
| | 16.9 | 5 | 5− |
| | 8.45 | 4+ | 4 |
| | 4.225 | 0 | 0 |
| Delta isomer | 76 | 5 | 5 |
| | 50.6 | 5 | 5 |
| | 33.8 | 5 | 5 |
| | 16.9 | 5− | 5− |
| | 8.45 | 4+ | 0 |
| | 4.225 | 0 | 0 |
| Alpha isomer | 17.7 | 0 | 0 |
| | 8.9 | 0 | 0 |
| | 4.45 | 0 | 0 |
| Beta isomer | 17.7 | 0 | 0 |
| | 8.9 | 0 | 0 |
| | 4.45 | 0 | 0 |

*Example 3—Foliar application*

To determine the effect of benzene hexachloride or the gamma isomer of benzene hexachloride when applied to the foliage of established lawn grasses and undesirable grasses as represented by Kentucky bluegrass and crabgrass, respectively, 35/65% acetone-water mixtures containing given quantities of these materials were prepared and applied to containers of established crabgrass and Kentucky bluegrass. Treatments were at the rates of 20, 40 and 80 pounds of active material per acre. Three weeks after application, the containers were examined and rated according to the Herbicidal Activity Index provided above and the results are recorded in Table III below. These results show that foliar application at 40 pounds per acre, or 15 pounds per acre in excess of that required for preemergence control, produces no undesirable effects on either crabgrass or Kentucky bluegrass.

TABLE III

|  | Number lbs. per acre | Crabgrass | Kentucky Bluegrass |
| --- | --- | --- | --- |
| Gamma isomer of benzene hexachloride. | 80 | 4 | 0 |
|  | 40 | 1 | 0 |
|  | 20 | 0 | 0 |
| Benzene hexachloride | 80 | 3+ | 3 |
|  | 40 | 0 | 0 |
|  | 20 | 0 | 0 |

*Example 4*

To determine the effect of the compounds of the instant invention when applied to seeded soil in a dry formulation, attaclay granules containing 10%, by weight, of the gamma isomer of benzene hexachloride were applied at rates equivalent to 5, 10, 20, 40 and 80 pounds per acre of active material to potted seeds of crabgrass and millet. In one series of tests the formulations were applied to seeded containers watered prior to application of the formulations. In the other series the formulations were applied to dry seeded containers and were not watered for 24 hours. Thereafter all were cared for in the conventional manner employed for raising greenhouse plants. Two weeks after treatment the tests were terminated, all containers were examined and all were rated according to the Herbicidal Activity Index mentioned above. The results are recorded in Table IV below.

TABLE IV.—EFFECT OF DRY FORMULATIONS OF THE COMPOUNDS OF THE INSTANT INVENTION APPLIED PREEMERGENCE AT VARIOUS RATES

|  | Number lbs. per acre | Crabgrass | | Millet | |
| --- | --- | --- | --- | --- | --- |
|  |  | Wet | Dry | Wet | Dry |
| Gamma Isomer of benzene hexachloride. | 80 | 5 | 5 | 5 | 5 |
|  | 40 | 5 | 5 | 5− | 5− |
|  | 20 | 5− | 4+ | 4 | 4 |
|  | 10 | 3+ | 3+ | 3+ | 3+ |
|  | 5 | 0 | 0 | 0 | 0 |

*Example 5—Field test dry formulation of benzene hexachloride*

To determine the effect of the compounds of the instant invention when applied to established lawns under field conditions, a dry formulation of attaclay containing 10%, by weight, of benzene hexachloride was applied at the rate of approximately 30 pounds of active material per acre. Application of this material was made early in the spring to an established plot of fescue and Kentucky bluegrass, prior to germination of crabgrass and barnyard grass seeds. The treated area was directly adjacent to the main lawn area and to a field heavily infested in the previous season with crabgrass and barnyard grass; likewise, the seeded area itself was heavily infested during the prior growing season with undesirable grasses. After application the treated area was maintained in the same manner as was the remainder of the lawn. At various intervals during the growing season, the lawn, the treated area and the adjacent crabgrass area were examined for establishment and growth of crabgrass and barnyard grass plants. Heavy infestation of the lawn and the crabgrass plot occurred during the growing season, while the treated area remained substantially free of both crabgrass and barnyard grass. Additionally, it was noted that the established fescue and the Kentucky bluegrass in the treated plot were healthy and showed no signs of damage due to application of the active material. Application of the material at the above rate appeared to produce 95% control.

What is claimed is:

1. A method for the preemergence control of undesirable grasses comprising applying to soil containing seeds of said undesirable grasses a composition containing an active ingredient selected from the group consisting of the gamma isomer of benzene hexachloride, the delta isomer of benzene hexachloride and mixtures of said gamma and delta isomers, said isomers and mixtures thereof being applied in an amount sufficient to effect preemergence herbicidal control of said undesirable grasses.

2. A method for the preemergence control of crabgrass comprising applying to soil containing crabgrass seeds a composition containing an active ingredient selected from the group consisting of the gamma isomer of benzene hexachloride, the delta isomer of benzene hexachloride and mixtures of said gamma and delta isomers, said isomers and mixtures thereof being applied in an amount sufficient to effect preemergence herbicidal control of said undesirable grasses.

3. A method according to claim 1 in which the benzene hexachloride composition is applied to the soil at the rate sufficient to provide at least 5 pounds of active component per acre.

4. A method according to claim 1 in which the benzene hexachloride composition is applied to the soil at the rate of at least 25 pounds per acre.

5. A method according to claim 1 in which the benzene hexachloride composition contains at least 20% of an isomer selected from the group consisting of the gamma isomer, the delta isomer and mixtures thereof and is applied at the rate of at least about 25 pounds per acre.

References Cited

UNITED STATES PATENTS 2,642,351   6/1953   Swezey _____ 71—66
2,945,752   7/1960   Mussell _____ 71—126

OTHER REFERENCES

MacLagan: Chemical Abstract, vol. 51–15871e (1957).
Serguv et al.: Chemical Abstract, vol. 54–25493e (1960).

JAMES O. THOMAS, Jr., *Primary Examiner.*

J. A. ADAMCIK, *Assistant Examiner.*